Sept. 12, 1950   E. G. BECKEMEYER ET AL   2,522,085
DEVICE FOR COOKING POPCORN
Filed Aug. 6, 1947

INVENTOR.
EDGAR G. BECKEMEYER
AND GLENN T. SCHMIDT.
BY Allen & Allen
ATTORNEYS.

Patented Sept. 12, 1950

2,522,085

UNITED STATES PATENT OFFICE 2,522,085

DEVICE FOR COOKING POPCORN

Edgar G. Beckemeyer, Fort Thomas, Ky., and Glenn T. Schmidt, Cincinnati, Ohio

Application August 6, 1947, Serial No. 766,750

2 Claims. (Cl. 219—19)

Our invention relates to a popcorn popper of the domestic type wherein the heat is developed by an electric element.

It is an object of our invention to provide a domestic popcorn popper where it is unnecessary to stir the popcorn being cooked and to insure the even popping of all the corn.

It is a further object of our invention to provide a popcorn popper which permits the visual inspection of the corn during cooking and which insures even heating of the corn container so that none of the kernels are burned while others remain unpopped.

It is a further object of our invention to provide a popcorn popper having a removable electric stove as a part of the same which may be used for other purposes, if desirable.

Another object of our invention is to provide a popcorn popper of extremely pleasing appearance but which may be made and sold at a very low cost.

These and other objects of our invention which will be set forth hereinafter or will be apparent to one skilled in the art upon reading these specifications, we accomplish by that certain construction and arrangement of parts of which we shall now describe an exemplary embodiment.

Reference is now made to the drawings forming a part hereof, and in which.

Figure 1:
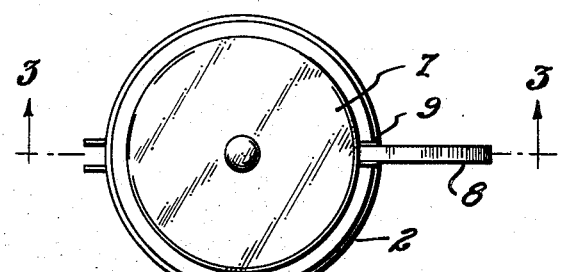
Figure 1 is a plan view of our novel popcorn popper.
Figure 2:
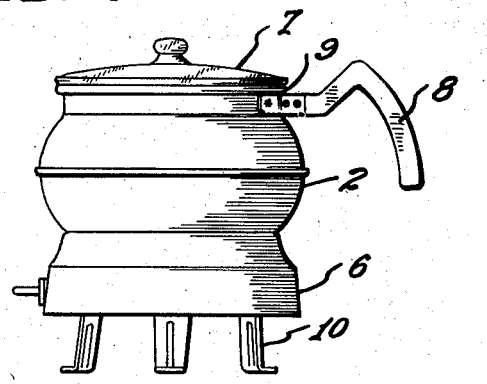
Figure 2 is a side elevation of our novel popcorn popper.
Figure 4:
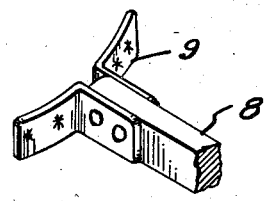
Figure 4 is a detailed perspective of the bracket for holding the handle to our novel popcorn popper.
Figure 3:
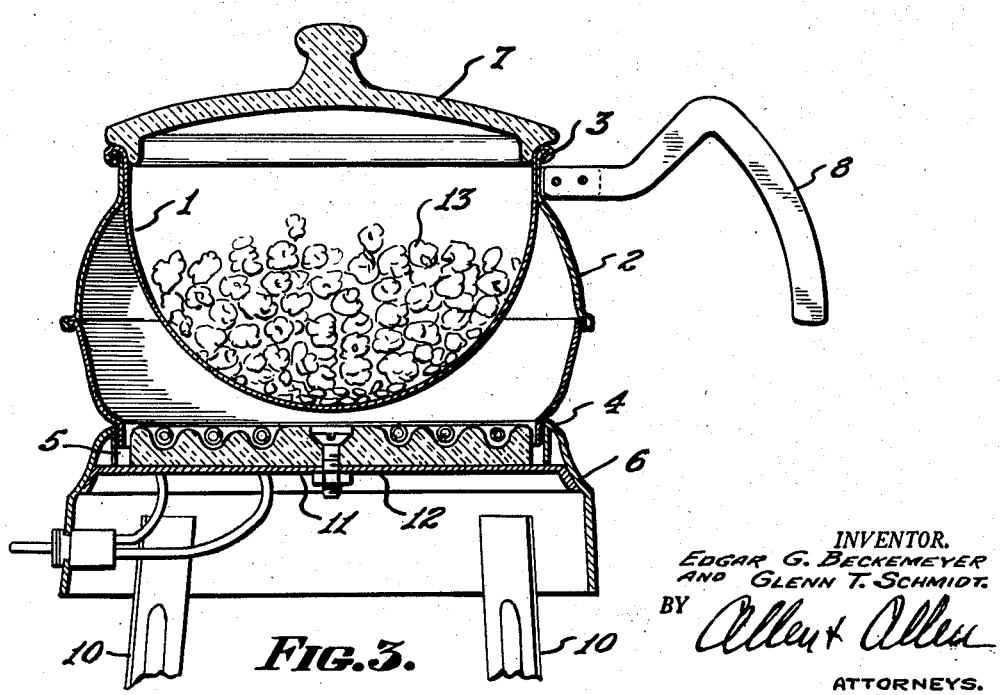
Figure 3 is a vertical cross section of our novel popcorn popper taken on the section line 3—3 of Figure 1.

Briefly, in the practice of our invention, we provide a popcorn retaining bowl of substantially hemispherical configuration surrounded by a heat chamber within which we provide a heating element. The corn retaining bowl is at all times out of contact with the heating element and the only heat received by the corn bowl is that created in the chamber surrounding the same. The chamber, together with the corn retaining bowl is readily removable from the stove carrying the heating element to permit pouring of the finished corn.

Due to the hemispherical configuration of the corn holding bowl, the actual popping of the corn itself displaces and moves the contents of the bowl around in the bowl so that all kernels receive substantially the same amount of heat with the fluffy popped kernels riding on top of the heavy unpopped kernels and thus insuring complete and uniform popping of the corn. Referring to the drawings, we provide a hemispherical metal corn retaining bowl 1, surrounding this bowl and supporting the same is a metal chamber 2. The bowl 1 is retained within one end of the chamber 2 and fastened thereto at its edge 3 either by rolling over the metal or some other manner well known in the art.

The lower end of the chamber 2 terminates in an annular lip 4 which in turn is removably retained within an annular groove 5 in the stove 6.

We preferably provide a cover 7 for the corn retaining bowl 1 which is preferably transparent so the action of the corn within the bowl during cooking may be inspected.

A handle 8 of non-conductive material is fastened to the chamber 2 by means of brackets 9 which may be spot welded to the chamber side or fastened in any other manner.

The stove 6 is supported by legs 10 and has a top surface 11 retaining a circular heating element 12 which is positioned within the annular groove 5.

The popcorn 13 is placed within the bowl 1 either with or without butter or other grease. The chamber 2 carrying the bowl 1 is then placed upon the stove 6 with the annular lip 4 of the chamber 2 resting in the groove 5 of the stove 6. From this, it is apparent that the heating element 12 is positioned within the chamber 2. The dimensions of the parts are such that the bowl 1 does not come in contact with the heating element 12 and only contacts the heating chamber 2 at its edge or lip 3.

When the electric current is turned on, the heating element 12 becomes hot and this in turn heats the air within the chamber 2. The heated air in turn heats the bowl 1 and the popcorn 13 retained therein. The cover 7 retains the heat within the bowl 1.

From the above, it is apparent that the bowl 1 and its contents is evenly heated and no hot spots are developed on the surface of the bowl 1. The popcorn 13, as it pops and becomes fluffy, stirs the kernels of corn around due to the explosive force of a popping kernel and the fluffy popped corn rides to the top of the unpopped kernels within the bowl 1. When the popcorn is completely popped as can be determined by peering through the transparent cover 7 or by the lack of further popping the chamber 2 together with the bowl 1 is removed from the stove 6 by the handle 8 and the popped popcorn may be readily poured from the container.

The removal of the chamber 2 from the stove 6 opens the lower portion of the chamber 2 and permits the heated air within the chamber 2 to escape so that subsequent batches of popcorn may be cooked without the danger of overheating the corn retaining bowl 1.

The popcorn bowl 1 as well as the chamber 2 is preferably made of aluminum, although stainless steel or other metal is satisfactory. The cover 7 is preferably formed of heat resistant glass, but it is within the contemplation of our invention to make the same of any other transparent material, or if desirable, of an opaque material with or without transparent windows.

From the above, it is apparent that we have provided an electric popcorn popper wherein it is unnecessary to stir the kernels of corn during cooking and where the even, complete popping of the corn is insured. It is also apparent that we have provided a unique popcorn popper together with an electric stove which is very pleasing in appearance and wherein the actual corn container may be removed from the stove and the stove used for other purposes.

It is to be understood that modification may be made in our invention without departing from the spirit of it, and we do not intend to limit ourselves otherwise than in the claims which follow. Having thus described our invention in an exemplary embodiment, what we claim as new and desire to secure by Letters Patent is:

1. A popcorn popper comprising a substantially hemispherical corn holding bowl, a heating chamber surrounding said bowl and attached to the edge of the bowl, the bottom of the chamber terminating in an annular lip, a stove consisting of a flat surface having an annular groove to receive said chamber lip, a heating element on said stove surface within said annular groove for heating said chamber and a substantially flat cover for said corn holding bowl.

2. A popcorn popper comprising a substantially hemispherical corn holding bowl, a heating chamber surrounding said bowl and attached to the edge of the bowl, the bottom of the chamber terminating in a lip, a stove consisting of a flat surface and carrying a heating element, a groove to receive said chamber lip in said stove surface and surrounding said heating element for the purpose described.

EDGAR G. BECKEMEYER.
GLENN T. SCHMIDT.

REFERENCES CITED

The following references are of record in the file of this patent:

UNITED STATES PATENTS

| Number | Name | Date |
|---|---|---|
| 1,456,141 | Morrison | May 22, 1923 |
| 1,465,995 | Pearson | Aug. 28, 1923 |
| 1,810,650 | Fay | June 16, 1931 |
| 1,857,781 | Hanyzer et al. | May 10, 1932 |
| 1,944,365 | Patchell et al. | Jan. 23, 1934 |
| 1,977,482 | Klause | Oct. 16, 1934 |
| 1,992,843 | Serenberg et al. | Feb. 26, 1935 |
| 2,056,941 | Krichton | Oct. 13, 1936 |
| 2,117,872 | Barnard | May 17, 1938 |
| 2,194,852 | Gundelfinger | Mar. 26, 1940 |
| 2,209,832 | Schurig | July 30, 1940 |

FOREIGN PATENTS

| Number | Country | Date |
|---|---|---|
| 438,570 | Great Britain | Nov. 19, 1935 |